2,716,606

FOOD WHIPPING AGENT

Bernard A. Patterson, Chicago, Ill.

No Drawing. Application December 26, 1952,
Serial No. 328,124

8 Claims. (Cl. 99—14)

This invention relates to a whipping agents for foodstuffs capable of performing in a superior manner to the presently known whipping agents including egg whites. Specifically, this invention deals with a whipping agent for cakes, pies, meringues and the like foodstuffs which is composed of a soluble caseinate, lactose, and an acidulant to produce the desired hydrogen ion concentration.

Good quality whipping agents must be capable of sustaining considerable quantities of milk or water, sugar, and other ingredients. Egg whites have conventionally been considered to ge good whipping agents and are used in considerable quantities to produce cakes, pies, and the like. The present invention now provides a whipping agent which can be substituted for considerable portions of egg whites to produce a superior quality whipping material especially suitable for angel food cakes and meringues. The whipping agent of this invention stabilizes the whipping qualities of egg albumen and actually produces a structure which will keep cake moist and "short."

A feature of the whipping agent of this invention is that it is especially adapted for reconstituting dried egg whites to produce whipping qualities in such dried egg whites which heretofore have not been obtainable from fresh liquid egg whites. The product of this invention, therefore, is especially useful in prepared dry cake mixes.

The whipping agent of this invention has been found to form a better emulsified union with the flour and sugar portions of the cake mix than the heretofore known whipping agents including pure liquid or dried egg whites. As a result, the whipping agent of this invention, when incorporated into either liquid or dried egg whites, will produce better uniformity in the resulting cake than has heretofore been possible.

It is then an object of this invention to provide a whipping agent for foodstuffs which contains an alkali metal caseinate and an acidulant to create a desired hydrogen ion concentration.

Another object of this invention is to provide a whipping agent containing an alkali metal caseinate, lactose or starch and a metaphosphate.

A specific object of this invention is to provide a whipping agent containing from .50 to 1.50 per cent by weight alkali metal caseinate, 1 to 5 per cent by weight hexametaphosphate and the balance lactose.

Another object of this invention is to provide a whipping formula for angel food cakes and the like to be added to sugar and flour for producing a more homogeneous cake texture than was heretofore possible.

Another specific object of this invention is to provide a casein whipping agent to replace from 20 to 35 per cent by weight of egg whites.

Other and further objects of the invention will be apparent to those skilled in the art from the following detailed description of several examples which illustrate preferred embodiments of the invention.

Example I

A whipping agent according to this invention is prepared by admixing together dry sodium caseinate obtained from sweet milk casein, hexametaphosphate, and lactose in the following proportions by weight:

.50 to 1.50% sodium caseinate
1 to 5% hexametaphosphate
Balance, lactose

The sodium caseinate may be substituted with any pure alkali metal caseinate such as potassium caseinate for example. The hexametaphosphate is preferable to other phosphates but disodium phosphates, tetra-sodium phosphates, and tetra- or di-potassium phosphates can be used.

The mixture should have a pH value of between 6.8 to 7 and should not be higher than 7.2.

The ingredients are thoroughly admixed in a dry state and are blended with dried egg whites to produce a mixture composed of from 5 to 25 per cent casein product and the balance dried egg whites. The preferred blend will contain from 20 to 25 per cent casein product.

A suitable angel food cake formula is then prepared in two separate portions including a whipping portion A and a flour portion B as follows:

Portion A:
  15 to 65% by weight sugar
  10 to 35% by weight dried egg white and casein product blend
  1 to 5% by weight hexametaphosphate
  .25 to 1% by weight sodium chloride Portion B:
  50 to 70% by weight sugar
  20 to 30% by weight flour
  .25 to 1% by weight cream of tartar
  Small amount of flavor—such as vanilla The A and B portions are packaged separately to provide the angel food cake mix in a dry state. The mix is composed of about 10% by weight portion A and 90% by weight portion B. The portion A is whipped with about 3 parts by weight of water to produce the foam. The portion B is then folded into the whipped product to provide the cake batter.

Example II

A specific angel food cake mix may be prepared as follows:

Mix together:
  1% by weight sodium of potassium caseinate
  98% by weight lactose, tapioca flour or corn starch
  1% by weight hexametaphosphate Two to four ounces of the above mixture are then added to 12 to 14 ounces of water to produce one pound of liquid material which is then added to 3 pounds of liquid egg whites to produce the egg mixture which is whipped into foam.

A flour mixture composed of 70 per cent by weight sugar, 30 per cent by weight flour, .7 percent by weight cream of tartar and .35 per cent by weight salt is prepared. From 28 to 36 pounds of this flour mixture are then folded into 4 pounds of foam to produce the cake batter which is then baked in the conventional manner for producing angel food cakes.

In this liquid egg white formula the cake mixture should be from 10 to 12% by weight of the water containing liquid product and from 88 to 90% by weight of the dry flour product.

Example III

A whipping agent composed of 1.5 per cent sodium caseinate, 96.5 per cent lactose and 2 per cent monosodium phosphate is blended into dried egg whites to constitute 25 per cent of the resulting blend. The dried egg white and casein blend is then suitable for use in preparing a cake batter having the following formula:

Portion A:
- 10% by weight casein egg white blend
- 65% by weight sugar
- 23.5 by weight flour
- .7 by weight salt
- .3 by weight cream of tartar
- .2 by weight flavor In general, suitable cake mixes will contain the following ingredients according to this invention:

- 10 to 14% by weight egg albumen including from 5 to 25% by weight casein, lactose and hexametaphosphate blend of this invention
- 20 to 25% by weight flour
- Balance by weight, sugar.

It should be understood that while the above examples refer particularly to cake mixes of the angel food type, the invention is, nevertheless, not limited to use in producing such cake mixes since the general whipping characteristics of the casein blend are useful in foodstuffs in general wherever it is desired to produce a froth or foam.

The casein mixture is substantially neutral although it may have a slight acidity which is sometimes useful to effect coagulation to produce more uniformity in the texture of the cake or food product.

Milk or dried milk powder does not produce the results obtained by casein since the milk powder has a high sugar content which prevents the casein from functioning as is required in a whipping agent. Additionally, certain buffer agents present in milk will prevent the casein from acting as a superior foam sustaining medium. The casein is, however, prepared from sweet milk but is in a substantially pure condition free from milk sugars, salt and the like ingredients conventionally found in dried milk powder.

From the above description it should, therefore, be understood that this invention now provides a superior whipping agent for foodstuffs.

I claim as my invention:

1. A whipping agent for cakes, pies, meringues and the like foodstuffs which comprises an alkali metal caseinate, lactose, and a phosphate, said agent having a pH value of from 6.8 to 7.2.

2. A whipping agent for foodstuffs comprising .5 to 1.5 per cent by weight alkali metal caseinate, 1 to 5 per cent by weight hexametaphosphate, balance lactose, said agent having a pH value of from 6.8 to 7.0.

3. A whipping agent especially adapted for angel food cake mixes and the like which comprises .5 to 1.5 per cent by weight sodium caseinate derived from pure sweet milk, 1 to 5 per cent by weight hexametaphosphate, balance lactose, said agent having a pH value of from 6.8 to 7.0.

4. A whipping agent for foodstuffs and the like which comprises a soluble casein salt, a food acidulant, and lactose, said agent being substantially neutral.

5. A whipping agent comprising egg albumen and from .5 to 35 per cent of a blend composed of an alkali metal caseinate, a phosphate, and lactose.

6. A whipping agent composed of dried egg whites and from 20 to 25 per cent of a blend containing alkali metal caseinate, hexametaphosphate, and lactose.

7. A whipping agent comprising dried egg whites and from 20 to 25 per cent of a blend composed of .5 to 1.5 per cent of alkali metal caseinate, 1 to 5 per cent of hexametaphosphate and balance lactose, said blend having a pH value of from 6.8 to 7.2.

8. A whipping agent comprising a dry blend of egg whites and a mixture composed of an alkali metal caseinate, an acidulant and a member of the group consisting of lactose, tapioca flour and corn starch.

References Cited in the file of this patent

UNITED STATES PATENTS

| | | |
|---|---|---|
| 1,373,651 | Cullen | Apr. 5, 1921 |
| 2,588,419 | Sevell et al. | Mar. 11, 1952 |
| 2,622,984 | Peebles et al. | Dec. 23, 1952 |

FOREIGN PATENTS

| | | |
|---|---|---|
| 483,430 | Great Britain | Apr. 20, 1938 |
| 637,506 | Great Britain | May 24, 1950 |